(12) United States Patent
Hickey et al.

(10) Patent No.: US 11,966,875 B2
(45) Date of Patent: Apr. 23, 2024

(54) SYSTEMS AND METHODS FOR PROVIDING DELIVERY TIME ESTIMATES

(71) Applicant: United Parcel Service of America, Inc., Atlanta, GA (US)

(72) Inventors: Donald Hickey, Atlanta, GA (US); Elizabeth Barayuga, Chester, NY (US); Jia Fan, Atlanta, GA (US)

(73) Assignee: United Parcel Service of America, Inc., Altanta, GA (US)

(*) Notice: Subject to any disclaimer, the term of this patent is extended or adjusted under 35 U.S.C. 154(b) by 694 days.

(21) Appl. No.: 16/914,017

(22) Filed: Jun. 26, 2020

(65) Prior Publication Data

US 2020/0410440 A1 Dec. 31, 2020

Related U.S. Application Data

(60) Provisional application No. 62/867,067, filed on Jun. 26, 2019.

(51) Int. Cl.
*G06Q 10/0833* (2023.01)
*G06F 16/29* (2019.01)
*G06Q 10/083* (2023.01)

(52) U.S. Cl.
CPC ......... *G06Q 10/0833* (2013.01); *G06F 16/29* (2019.01); *G06Q 10/0838* (2013.01)

(58) Field of Classification Search
CPC . G06Q 10/0833; G06Q 10/0838; G06F 16/29
See application file for complete search history.

(56) References Cited

U.S. PATENT DOCUMENTS

| | | | |
|---|---|---|---|
| 2009/0144230 A1* | 6/2009 | Fant | G06F 16/29 |
| 2009/0327307 A1* | 12/2009 | Sun | G06Q 10/08 |
| 2017/0024446 A1* | 1/2017 | O'Kane | G06F 16/2282 |
| 2017/0154347 A1* | 6/2017 | Bateman | G06Q 10/067 |
| 2019/0251626 A1* | 8/2019 | Jezewski | G06Q 40/06 |

OTHER PUBLICATIONS

Matthew Beaulieu, Predictive Shipping, Mar. 2017, Worcester Polytechnic Institute (Year: 2017).*

* cited by examiner

*Primary Examiner* — Resha Desai
*Assistant Examiner* — Ismail A Manejwala
(74) *Attorney, Agent, or Firm* — Shook, Hardy & Bacon L.L.P.

(57) ABSTRACT

Embodiments are disclosed for determining delivery confidence intervals. An example method for determining a confidence interval includes the following operations. Delivery information is received from one or more sources, wherein the delivery information comprises data associated with at least one predefined location perimeter. The data associated with the at least one predefined location perimeter is normalized. The normalized data is categorized into training data used to perform a deep neural network regression analysis. A predicted delivery confidence interval is determined by constructing a predictive learning model by conducting a regression of the data using deep neural network regression. The predicted delivery confidence interval is stored in a results table in association with the predefined location perimeter. And, upon receiving a request from a visibility management system, accessing the results table to provide predicted delivery windows to consignees.

20 Claims, 4 Drawing Sheets

SYSTEMS AND METHODS FOR PROVIDING DELIVERY TIME ESTIMATES

CROSS-REFERENCE TO RELATED APPLICATIONS

This application claims the benefit of priority under 35 U.S.C. § 119(e) to the filing date of U.S. Provisional Patent Application No. 62/867,067 filed Jun. 26, 2019, entitled, "System And Methods For Providing Delivery Time Estimates," which is incorporated herein by reference in its entirety.

FIELD

The present disclosure relates to using machine learning technology to determine a delivery confidence interval, and, more particularly, to using gathered delivery information and machine learning models to generate delivery confidence intervals.

SUMMARY

Example embodiments described herein comprise systems that predicts a delivery confidence interval. The details of some embodiments of the subject matter described in this specification are set forth in the accompanying drawings and the description below. Other features, aspects, and advantages of the subject matter will become apparent from the description, the drawings, and the claims. Various embodiments are directed to an apparatus, a method, and a system for determining a delivery confidence interval.

In some aspects, the method for determining a confidence interval includes the following operations. Delivery information is received from one or more sources, wherein the delivery information comprises data associated with at least one predefined location perimeter. The data associated with the at least one predefined location perimeter is normalized, wherein the normalization reduces redundancies and removes outliers from the data. The normalized data is categorized into training data used to perform a deep neural network regression analysis. A predicted delivery confidence interval is determined by conducting a regression of the data using deep neural network regression designed to cease learning upon detecting a predetermined reduction in error rate. The predicted delivery confidence interval is stored in a results table in association with the predefined location perimeter. And, a visibility management system is provided access to the results table to allow the visibility management system to utilize data in the results table to provide predicted delivery windows to consignees.

In some aspects, the apparatus for determining delivery confidence intervals includes one or more non-transitory computer-storage media having computer readable instructions embodied thereon that, when executed, performs the following operations. Data associated with at least one geographic area is retrieved, wherein the at least one geographic area comprises a Zip8 or Zip9 geographic area. A results table is generated comprising the at least one geographic area data associated with the at least one geographic area. Information for a particular delivery having a delivery location in one of the Zip8 or Zip9 geographic areas stored in the results table. The results table is used to generate a delivery confidence interval for the particular delivery. Based on the delivery confidence interval, a predicted delivery window for the particular delivery is determined. And, a notification is delivered to a user that includes the predicted delivery window.

In some aspects, the system for determining a delivery confidence interval includes a storage system for storing and retrieving delivery information from one or more sources, wherein the delivery information comprises data associated with at least one of Zip8 or Zip9 geographic area. A data normalization system for normalizing the data associated with the at least one of the Zip8 or Zip9 geographic area, wherein the normalizing reduces redundancies and removes outliers from the data. A categorization system for categorizing the normalized data into training data used to perform a deep neural network regression analysis. A results system for generating a results table that comprises the normalized data associated with the data associated with the at least one of the Zip8 and Zip9 geographic area. And, a visibility management system for utilizing the results table to provide a predicted delivery window to a consignee whose delivery location is within at least one of the Zip8 or Zip9 geographic area.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF FIGS

Having thus described the disclosure in general terms, reference will now be made to the accompanying drawings, which are not necessarily drawn to scale, and wherein:

FIG. 1 provides an illustration of an exemplary operating environment according to aspects of the present disclosure;

DETAILED DESCRIPTION

Figure 1:
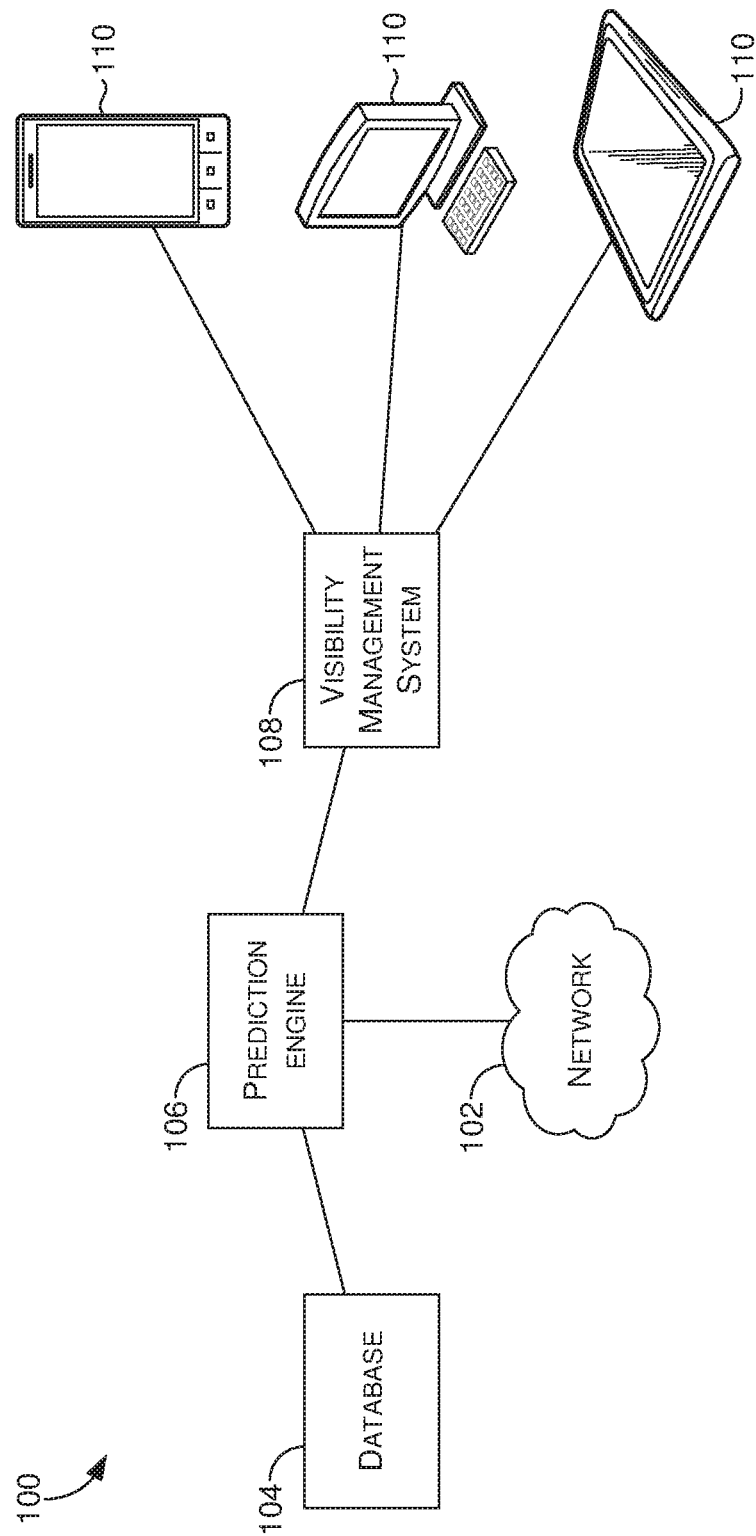

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

The disclosure herein relates to systems and methods for providing delivery confidence intervals.

Systems and methods can be used to predict different aspects of a package delivery, from the estimated delivery time, to the route the delivery vehicle will take. Certain conventional methods used to estimate delivery time can lead to inefficient use of information and a waste of resources. For instance, some systems and methods give incorrect or overly-broad windows for delivery time which can confuse or frustrate consumers. These incorrect or overly-broad windows can lead to packages being stolen or returned. This in turn can increase a company's delivery expenses which also increases the cost to consumers. It would be advantageous to provide more accurate package delivery windows and reduce the overall cost of delivery for both the delivery company and the consumer.

The systems and methods as described herein alleviate one or more of the above-mentioned problems. In certain aspects, the systems and methods described herein can increase the accuracy of delivery time estimates, which can in turn decrease the likelihood of a delivery being missed or a package being stolen. In the same or alternative aspects, systems and methods described herein can reduce the cost of shipping by reducing the chance that a package will need to be returned or redelivered to the same location. Further, in aspects, the systems and methods descried herein can use multiple factors and machine learning techniques to identify the optimal window, which signifies the appropriate delivery confidence interval to be used to notify a customer of a package delivery. This can improve the customer experience by providing accurate windows and can drive down costs by reducing the number of packages that must be resent.

In aspects, the systems and methods described herein comprise aggregating delivery information related to predefined location perimeters and analyzing multiple factors through machine learning techniques to estimate delivery times for the packages. The predefined location perimeters can be defined by Zip8 or Zip9 location perimeters. Zip8, for example, which is an 8-digit zip code, would encompass a larger geographical area than Zip9. While Zip8 and Zip9 are used herein, they are used for exemplary purposes and not meant to limit aspects in any way. For instance, countries outside of the United States may not use zip codes, but some other system of identifying geographical areas for parcel delivery. The system can take into account factors such as driver location, prior delivery records, seasonality, and the like. The system can analyze this information using machine learning techniques (e.g., deep neural network) to determine delivery confidence intervals for the deliveries. In aspects, this delivery confidence interval can be used to create a predicted delivery window. The delivery window can be provided at the time of manifestation, such as when a customer purchases an item for delivery. Additionally, the methods and systems can provide delivery windows with a confidence factor so the customer has an accurate idea of when the package may be delivered. For example, one package may have a three hour delivery window, while another may be a specific time (e.g., 10:53 AM) with a one hour window from that time with a 95% confidence level. Or, the consumer may be provided with a three hour window for delivery without the confidence interval information (e.g., 10:50 AM-1:50 PM). For example, at the time a consumer makes a purchase, such as at the time of tender, the consumer may be provided with a delivery window and a confidence factor for that delivery window. In aspects, this delivery time and/or delivery window would remain consistent until the delivery is made, providing the consumer with a realistic idea of a deliver time.

Various embodiments of the present disclosure improve existing software technologies via new functionalities that these existing technologies or computing devices do not currently employ. Further, various embodiments improve various computer operations and resources (e.g., disk I/O). For example, some embodiments improve existing software technologies by using machine learning to determine more accurate confidence intervals through the use of data associated with a predefined location perimeter via certain rules. As described above, such techniques are not used in current technologies, and as will be appreciated from the description below, the embodiments provide for an increase in accuracy and processing time in determining delivery confidence intervals.

II. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXAMPLE DEFINITIONS

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

The terms "package," "parcel," "item," and/or "shipment" refer to any tangible and/or physical object, such as a wrapped package, a container, a load, a crate, items banded together, an envelope, suitcases, vehicle parts, pallets, drums, vehicles, and the like sent through a delivery service from a first geographical location to one or more other geographical locations.

The term "delivery information" refers to data describing package deliveries made by a carrier. In some embodiments, the delivery information comprises one or more package received time, manifest package time, package information such as tracking number, package activity time stamp, package dimension including height, length and width, package weight, package manifested weight, package manifest time stamp, package service type, package scanned time stamp, package tracking number, package sort type code, package scanned code, unit load device type code, account number associated with the package, driver information, seasonality and the like. In some embodiments, delivery information may be received from databases, vehicles or mobile computing entities.

The term "prediction system" refers to a management tool that centrally collects and manages delivery information. Additionally, the prediction system determines predicted delivery confidence intervals through the use of machine learning techniques and generates results tables. The delivery information may be provided by different service points, vehicles, mobile computing entities, and any other electronic devices that gather shipper behavior data. Alternatively or in addition, the shipper behavior data management tool may receive shipper behavior data directly from a distributed computing entity. In some embodiments, the shipper behavior data management tool is embedded within shipper behavior predicting entity.

The term "feature" in various contexts refers to data generated based on delivery information and subsequently fed into a machine learning model. In some embodiments, the features are equivalent to delivery information. Alternatively or in addition, the features can be generated by other techniques. For example, if the delivery information comprises "manifest time: 9:00 am; received time: 10:04 am; package weight: 30 lb", the features generated can be based on categorization of each of the elements present in the delivery information in the form of "manifest time: morning; received time: morning; package weight: heavy". In some embodiments, one feature may be generated based on multiple instances of delivery information. For example, package received time for multiple occasions can be used to generate one feature. A prediction system may use delivery information that represents package manifest time and package received time in the past two months and generate a feature called "percentage of early manifests in the past two months".

The term "machine learning model" refers to a model that is used for machine learning tasks or operations. In various embodiments, a machine learning model can receive an input (e.g., a target image) and, based on the input, identify patterns or associations in order to predict a given output (e.g., predict that the image style of the target image is of a certain class). Machine learning models can be or include any suitable model, such as one or more: neural networks (e.g., CNN), deep neural networks, word2Vec models, Bayesian networks, Random Forests, Boosted Trees, etc.

"Machine learning" as described herein, and in particular embodiments, corresponds to algorithms that parse or extract features of historical data (e.g., instances of documents), learn (e.g., via training) about the historical data by making observations or identifying patterns in data, and then receive a subsequent input (e.g., a current target image) in order to make a determination, prediction, and/or classification of the subsequent input based on the learning without relying on rules-based programming (e.g., conditional statement rules).

The term "seasonality" as described herein, and in particular embodiments, refers to a higher or lower number of packages delivered to a certain geographic region during certain times of the year. For example, the seasonality measurement around December 25$^{th}$ will likely be high as there is likely an increased number of packages being shipped, on, after, or before this date.

Figure 5:
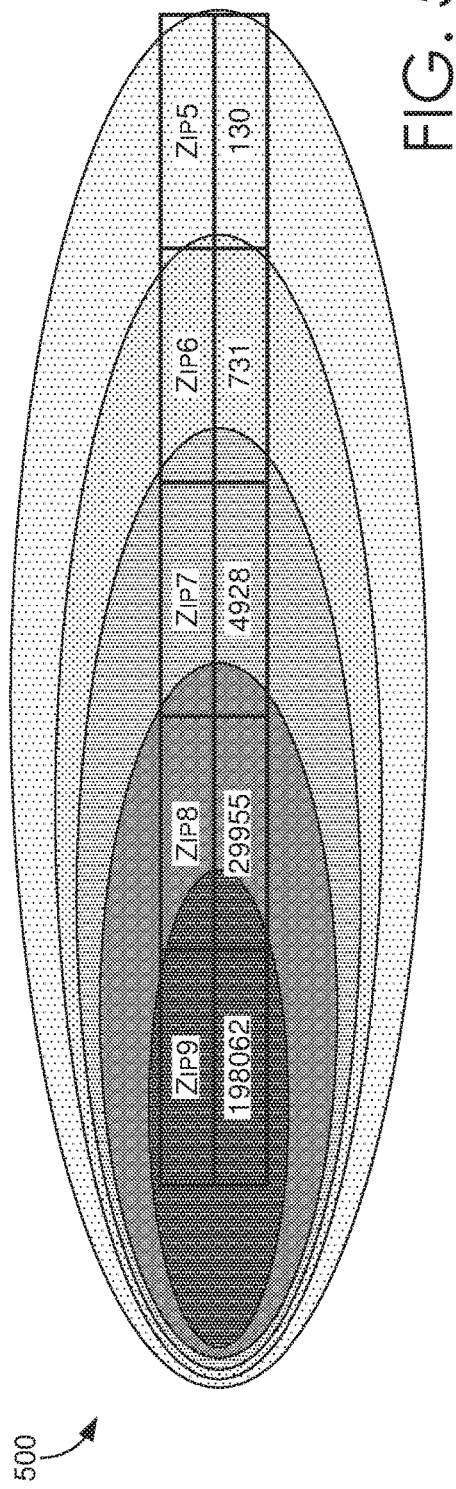
FIG. 5 illustrates an example of a Zip9 and Zip8 geographic perimeter.

The term "location perimeter" as described herein, and in particular embodiments, refers to predetermined geographic areas. One example of a location perimeter is a zip code. In the example of zip codes, the number of digits associated with the code defines the size of the area. An examplary visualization of this is represented in FIG. 5. As can be seen in FIG. 5, Zip9 refers to a smaller geographic perimeter, as the zip code has a larger number of digits, Zip8 refers to a slightly larger geographic area as the zip code has a smaller number of digits, and so on. As used herein, the term location perimeter is not limited to zip codes as used in the United States, but can refer to any predefined geographic perimeter and is not limited to zip codes.

IV. EXAMPLE SYSTEM ARCHITECTURE

FIG. 1 provides an illustration of an exemplary operating environment according to aspects of the present disclosure. As shown in FIG. 1, this particular embodiment may include one or more prediction engines 106 connected to one or more databases 104, one or more visibility management systems, and one or more networks. Additionally, the particular embodiment shown in FIG. 1 may also include user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Prediction System

The prediction system 100 may comprise a prediction engine and visibility management system among other modules. In certain embodiments, the prediction system 100 may be maintained by and/or accessible by a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the prediction system 100 may also include one or more communications interfaces for communicating with various computing entities, such as by communicating data, content, information, and/or similar terms used herein interchangeably that can be transmitted, received, operated on, processed, displayed, stored, and/or the like.

In one embodiment, the prediction system 100 may include or be in communication with one or more processing elements (also referred to as processors, processing circuitry, processing devices, and/or similar terms used herein interchangeably) that communicate with other elements within the prediction system 100 via a bus, for example. As will be understood, the processing element 305 may be embodied in a number of different ways. For example, a processing element may be embodied as one or more complex programmable logic devices (CPLDs), microprocessors, multi-core processors, coprocessing entities, application-specific instruction-set processors (ASIPs), microcontrollers, and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly. For example, processing element may be configured to perform various functionality of a shipper behavior prediction engine, such as In one embodiment, the prediction system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, hierarchical database model, network model, relational model, entity-relationship model, object model, document model, semantic model, graph model, and/or the like.

In one embodiment, the prediction system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the shipper behavior predicting entity 100 with the assistance of the processing element and operating system.

As indicated, in one embodiment, the prediction system 100 may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the prediction system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the prediction system 100 may include or be in communication with one or more input elements, such as a keyboard input, a mouse input, a touch screen/display input, motion input, movement input, audio input, pointing device input, joystick input, keypad input, and/or the like. The prediction system 100 may also include or be in communication with one or more output elements (not shown), such as audio output, video output, screen/display output, motion output, movement output, and/or the like.

In some embodiments, processing element, non-volatile memory and volatile memory may be configured to support a shipper behavior predicting engine. For example, the processing element may be configured to execute operations that comprise the shipper behavior predicting engine, and non-volatile memory and volatile memory may be configured to store computer code executed by the processing element, as well as to store relevant intermediate or ultimate results produced from execution of the shipper behavior prediction engine.

As will be appreciated, one or more of the prediction system's 100 components may be located remotely from other prediction system 100 components, such as in a distributed system. Furthermore, one or more of the components may be combined and additional components performing functions described herein may be included in the prediction system 100. Thus, the prediction system 100 can be adapted to accommodate a variety of needs and circumstances. As will be recognized, these architectures and descriptions are provided for exemplary purposes only and are not limited to the various embodiments.

4. Exemplary User Computing Entity

User computing entities 110 may be configured for autonomous operation and/or for operation by a user (e.g., a vehicle operator, delivery personnel, customer, and/or the like). In certain embodiments, user computing entities 110 may be embodied as handheld computing entities, such as mobile phones, tablets, personal digital assistants, and/or the like, that may be operated at least in part based on user input received from a user via an input mechanism. Moreover, user computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, mobile computing entities 110 may be utilized as onboard controllers for UAVs configured for picking-up and/or delivering packages to various locations, and accordingly such mobile computing entities 110 may be configured to monitor various inputs (e.g., from various sensors) and generated various outputs (e.g., control instructions received by various vehicle drive mechanisms). It should be understood that various embodiments of the present disclosure may comprise a plurality of mobile computing entities 110 embodied in one or more forms (e.g., non-handheld computing entities, handheld mobile computing entities 110, vehicle-mounted mobile computing entities 110, and/or autonomous mobile computing entities 110).

As will be recognized, a user may be an individual, a family, a company, an organization, an entity, a department within an organization, a representative of an organization and/or person, and/or the like—whether or not associated with a carrier. In one embodiment, a user may operate a mobile computing entity 110 that may include one or more components that are functionally similar to those of the prediction system 100.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the mobile computing entity's 110 position in connection with a variety of other systems, including cellular towers, Wi-Fi access points, and/or the like. Similarly, the mobile computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface, and/or a user input interface. For example, the user interface may be a user application, browser, user interface, and/or similar words used herein interchangeably executing on and/or accessible via the user computing entity 110 to interact with and/or cause display of information from the prediction entities 100, as described herein. The user input interface can comprise any of a number of devices or interfaces allowing the user computing entity 110 to receive information/data, such as a keypad (hard or soft), a touch display, voice/speech or motion interfaces, or other input device. In some embodiments including a keypad, the keypad can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 may also include a camera, imaging device, and/or similar words used herein interchangeably (e.g., still-image camera, video camera, IoT enabled camera, IoT module with a low resolution camera, a wireless enabled MCU, and/or the like) configured to capture images. The user computing entity 110 may be configured to capture images via an onboard camera, and to store those imaging devices/cameras locally, such as in volatile memory and/or non-volatile memory. As discussed herein, the mobile computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera. The contextual data may be stored as a portion of the image (such that a visual representation of the image data includes the contextual data) and/or may be stored as metadata associated with the image data that may be accessible to various computing entities.

The mobile computing entity 110 may include other input mechanisms, such as scanners (e.g., barcode scanners), microphones, accelerometers, RFID readers, and/or the like configured to capture and store various information types for the mobile computing entity 110. For example, a scanner may be used to capture package/item/shipment information/data from an item indicator disposed on a surface of a shipment or other item. In certain embodiments, the mobile computing entity 110 may be configured to associate any captured input information/data, for example, via the onboard processing element. For example, scan data captured via a scanner may be associated with image data captured via the camera such that the scan data is provided as contextual data associated with the image data.

The mobile computing entity 110 can also include volatile storage or memory and/or non-volatile storage or memory, which can be embedded and/or may be removable. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile computing entity 110. As indicated, this may include a user application that is resident on the entity or accessible through a browser or other user interface for communicating with the prediction entities 100 and/or various other computing entities.

In another embodiment, the mobile computing entity 110 may include one or more components or functionality that are the same or similar to those of the shipper behavior predicting entities 100, as described in greater detail above. As will be recognized, these architectures and descriptions are provided for exemplary purposes only and are not limiting to the various embodiments.

5. Exemplary Package/Item/Shipment Information

As noted herein, various items that are to be shipped may have an associated profile or record that is stored in a database. The profile may be utilized by the carrier to track the current location of the item and to store and retrieve information about the item. For example, the item profile may comprise electronic data corresponding to the associated item, and may identify various shipping instructions for the item, various characteristics of the item, and/or the like. The electronic data may be in a format readable by various computing entities, such as a shipper behavior predicting entities 100, a mobile computing entity 110, an autonomous vehicle control system, and/or the like. However, it should be understood that a computing entity configured for selectively retrieving electronic data within various item profiles may comprise a format conversion aspect configured to reformat requested data to be readable by a requesting computing entity. As used herein, an item profile may refer to stored information in reference to a particular item, a package, a parcel, a shipment, etc.

In various embodiments, item profile comprises identifying information corresponding to the item. The identifying information may comprise information identifying the unique item identifier associated with the item. Accordingly, upon providing the identifying information to the item detail database, the item detail database may query the stored item profiles to retrieve the item profile corresponding to the provided unique identifier.

Moreover, the package/item/shipment profiles may comprise shipping information for the item. For example, the shipping information may identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is required, and/or the like. In certain embodiments, at least a portion of the shipping information may be utilized as identifying information to identify a item. For example, a destination location may be utilized to query the item detail database to retrieve data about the item.

In certain embodiments, the item profile comprises characteristic information identifying item characteristics. For example, the characteristic information may identify dimensions of the item (e.g., length, width, height), a weight of the item, contents of the item, or the like. In certain embodiments, the contents of the item may comprise a precise listing of the contents of the item (e.g., three widgets) or the contents may identify whether the item contains any hazardous materials (e.g., the contents may indicate whether the item contains one or more of the following: no hazardous materials, toxic materials, flammable materials, pressurized materials, controlled substances, firearms, and/or the like).

VI. EXAMPLE SYSTEM OPERATION

Figures 2, 3:
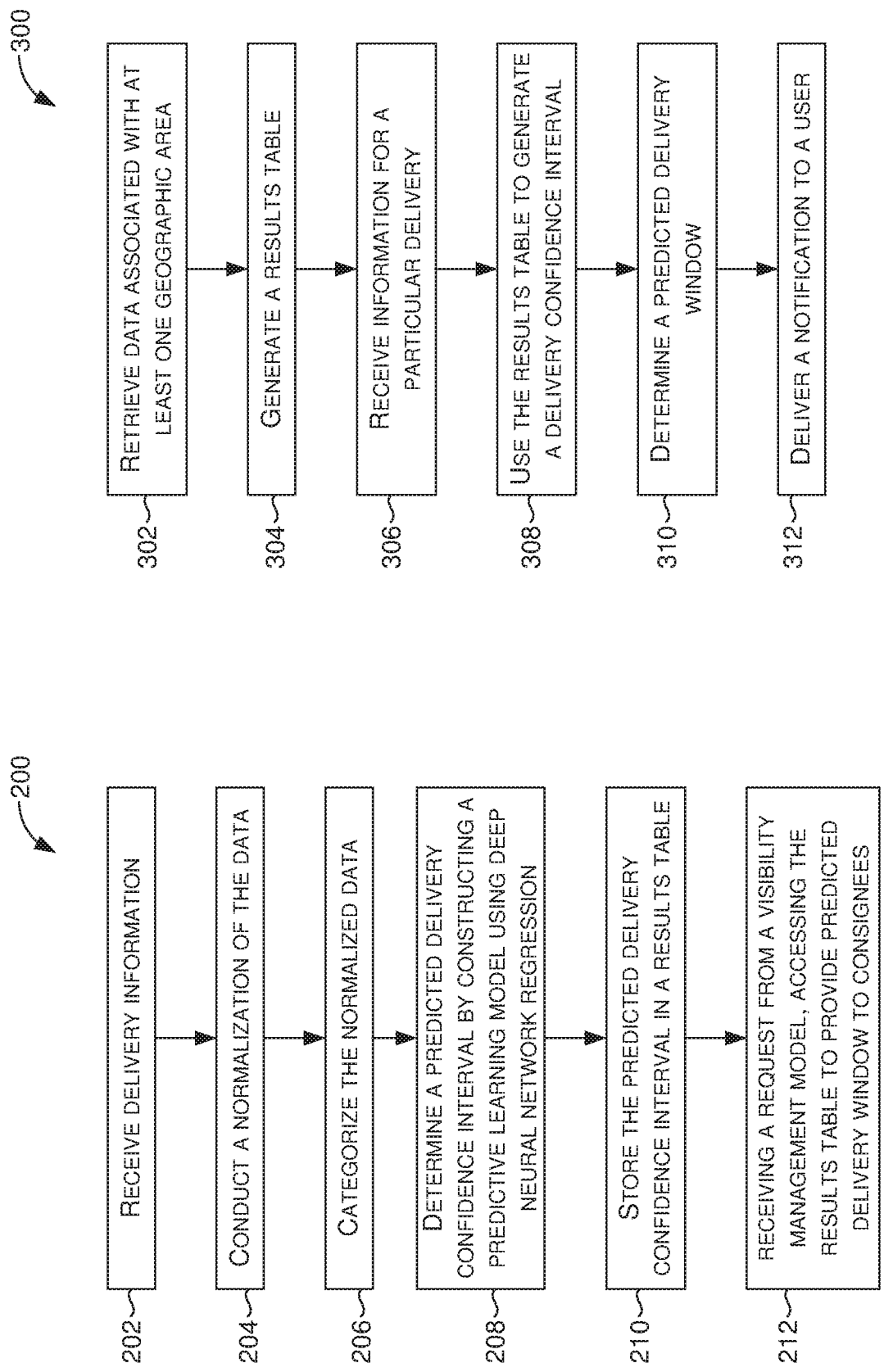
FIG. 2 illustrates a flow diagram of an exemplary method for determining a delivery confidence interval, in accordance with aspects of the present disclosure.
FIG. 3 illustrates a flow diagram of an exemplary method for determining a delivery confidence interval, in accordance with aspects of the present disclosure.

FIG. 2 illustrates a flow diagram of an exemplary method for determining a delivery confidence interval, in accordance with aspects of the present disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The operations illustrated in FIG. 2 may, for example, be performed by prediction system 100, and in this regard, the prediction system 100 may perform these operations through the use of one or more of processing elements, non-volatile memory, and volatile memory. It will be understood that the prediction system comprises a set of hardware components or hardware components coupled with software components configured to determine a predicted delivery confidence interval using deep neural network regression. These components may, for instance, utilize a processing element to execute operations, and may utilize non-volatile memory to store computer code executed by the processing element, as well as to store relevant intermediate or ultimate results produced from the prediction system. It should be appreciated that, in some embodiments, the prediction system may include a separate process, specially configured field programmable gate array (FPGA), or application specific interface circuit (ASIC) to perform its corresponding functions. In addition, computer program instructions and/or other type of code may be loaded onto a computer, processor or other programmable apparatus's circuitry to produce a machine, such that the computer, processor other programmable circuitry that execute the code on the machine create the means for implementing the various functions described in connection with the prediction system.

At block 202, the prediction system receives delivery information from one or more sources, wherein the delivery information comprises data associated with at least one predefined location perimeter. In some embodiments, the delivery information comprises one or more of a driver location, prior delivery records, or a seasonality. In some embodiments, the delivery information can be received from mobile computing devices or databases other than database 104. Data associated with a predefined location perimeter can encompass any type of defined perimeter. For instance, in the United States, a predefined location perimeter may be associated with a zip code, such as a Zip8 (8-digit zip code) or Zip9 (9-digit zip code) location perimeter. But, in other countries, other types of location perimeters are utilized, and are contemplated to be included herein within the definition of a location perimeter. In further embodiments, the Zip8 and Zip9 locations are specifically not defined as a physical address. Additionally, in some embodiments, the delivery information is collected over the course of 18 months.

At block 204, the prediction system conducts a normalization of the data associated with the at least one predefined location perimeter, wherein the normalization reduces redundancies and removes outliers from the data. In additional embodiments, normalization entails filtering out duplicate information, and any information missing parameters. In additional examples, the normalization prepares the data to be used in deep neural network regression. In these additional examples, the features of the data are normalized via one hot encoding, wherein the features of the data are represented using a 0 or 1.

At block 206, the prediction system categorizes the normalized data into training data used to perform a deep neural network regression analysis. In some embodiments, the data is categorized into training data for the deep neural network regression analysis and stopping criteria data for the deep neural network regression analysis. In some embodiments, the training data and stopping criteria data are randomly selected from the normalized delivery information. In other embodiments, the training data and stopping criteria data are categorized based on date or location. In further embodiments, the data is categorized into 80% training data and 20% stopping criteria data. In some embodiments, the data is categorized into 95% training data and 5% stopping criteria data.

In further embodiments, the stopping criteria data is used to determine whether the machine learning has reached an acceptable level of error rate. Providing stopping criteria helps to avoid overfitting of the training dataset. For example, if the neural network were allowed to train indefinitely, there is a chance that the neural network will train to closely on that dataset. This can create generalization errors making the network less useful at making predictions on new data. In some embodiments, the neural network model is evaluated on the stopping criteria data, and if the performance of the model on the stopping criteria data starts to degrade, the training process is stopped.

Figure 6:
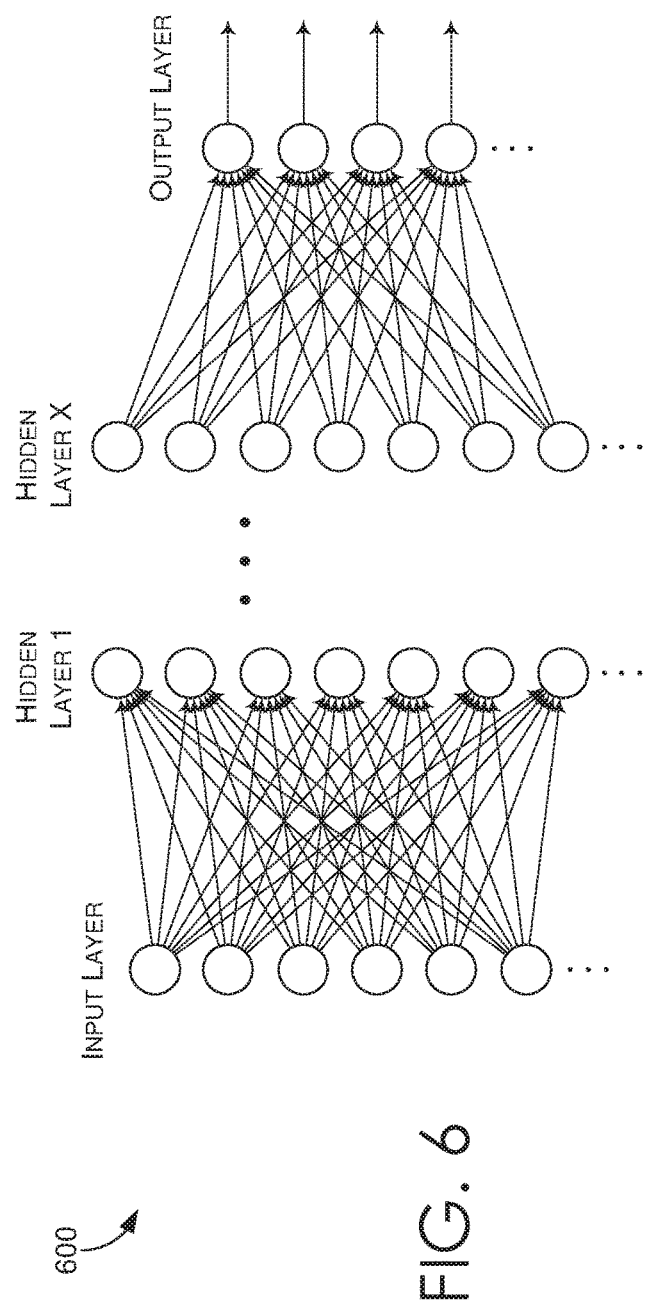
FIG. 6 illustrates an exemplary deep neural network, in which aspects of the present disclosure are employed.

At block 208, the prediction system constructs a predictive learned model by conducting a regression of the data using deep neural network regression designed to cease learning upon detecting a predetermined reduction in error rate. Using the predictive learned model, a confidence interval is determined from prior predictions (e.g., at a Zip8 or Zip9 level), with accuracies on a set of time windows. In some embodiments, the deep neural network is comprised of an input layer, an output layer, and at least two hidden layers. FIG. 6 illustrates an example embodiment of a deep neural network. In some embodiments, the predicted confidence interval determined by the deep neural network comprises a probability score associated with a location perimeter, such as a Zip8 or Zip9 location perimeter, and in other embodiments, the predicted confidence interval comprises a percent chance of a package arriving at any given time to a location within location perimeter, such as a Zip8 or Zip9 location perimeter.

At block 210, the prediction system stores the predicted delivery confidence interval in a results table in association with the predefined location perimeter. In some embodiments, the results are stored in a results table located in prediction system 106. In other embodiments, the results are stored in a results table located in database 104. In some embodiments, the results table comprises storing the predicted delivery confidence interval in association with a Zip8 or Zip9 location perimeter. In further embodiments, the results table comprises storing the predicted delivery confidence interval in the form of a percent chance that a package will arrive at a given location during a given timeframe.

At block 212, the prediction system, leveraging the predictive learned model discussed at block 208, responds to requests, including real-time requests (e.g., calls) from the visibility management system 108. Prior accuracy information stored in the results table provides additional knowledge to the prediction system, and thus to the visibility management system 108 to utilize data in the results table to provide predicted delivery windows to consignees. In some embodiments, the predicted delivery window contains the delivery confidence interval. In some embodiments, the predicted delivery window comprises at least one of a date, a time, a location, or a confidence interval. In further embodiments, the predicted delivery window utilizes the delivery confidence interval, but does not contain the delivery confidence interval.

In further embodiments, an indication is received that a package is to be delivered to a specific location within a predefined location perimeter whose predicted confidence interval is stored within the results table. In this embodiment, the results table is accessed and a notification is delivered to a consignee associated with the package including a predicted delivery window. In some embodiments, this predefined location perimeter is defined as a Zip8 or Zip9 location perimeter. In further embodiments, the method illustrated in FIG. 2 comprises causing the delivery of a parcel.

FIG. 3 illustrates a flowchart which describes one or more non-transitory computer-storage media having computer executable instructions embodied thereon that, when executed, perform a method for using a prediction system 106 to determine a predicted delivery confidence interval. The operations illustrated in FIG. 2 may, for example, be performed by prediction system 106, and in this regard, the apparatus 100 may perform these operations through the use of one or more of processing elements, non-volatile memory, and volatile memory. It will be understood that the prediction system comprises a set of hardware components or hardware components coupled with software components configured to determine a predicted delivery confidence interval using deep neural network regression. These components may, for instance, utilize the processing element 305 to execute operations, and may utilize non-volatile memory to store computer code executed by the processing element, as well as to store relevant intermediate or ultimate results produced from the prediction system. It should be appreciated that, in some embodiments, the prediction system may include a separate process, specially configured field programmable gate array (FPGA), or application specific interface circuit (ASIC) to perform its corresponding functions. In addition, computer program instructions and/or other type of code may be loaded onto a computer, processor or other programmable apparatus's circuitry to produce a machine, such that the computer, processor other programmable circuitry that execute the code on the machine create the means for implementing the various functions described in connection with the prediction system.

At block 302, the prediction system retrieves data associated with at least one geographic area, the at least one geographic area comprising a Zip8 or Zip9 geographic area. At block 304, the prediction system generates a results table that comprises the at least one geographic area and the data associated with the at least one geographic area. At block 306, the prediction system receives information from a particular delivery having deliver location in one of the Zip8 or Zip9 geographic areas stored in the results table. At block 308, the prediction system uses the results table to generate a delivery confidence interval for the particular deliver. In some embodiments, this can be accomplished through the use of various machine learning techniques, as defined herein.

At block 310, the prediction system determines a predicted delivery window for the particular delivery, based on the deliver confidence interval. In some embodiments, the prediction system provides the visibility management system the results table, which is used to determine a predicted delivery window, which is then delivered in the form of a notification to a user that includes the predicted delivery window. At block 312, the visibility management system delivers a notification to a user that includes the predicted delivery window. In some embodiments, the notification can be delivered to a user device 110. In further embodiments, the notification comprises at least textual information or auditory information.

Figure 4:
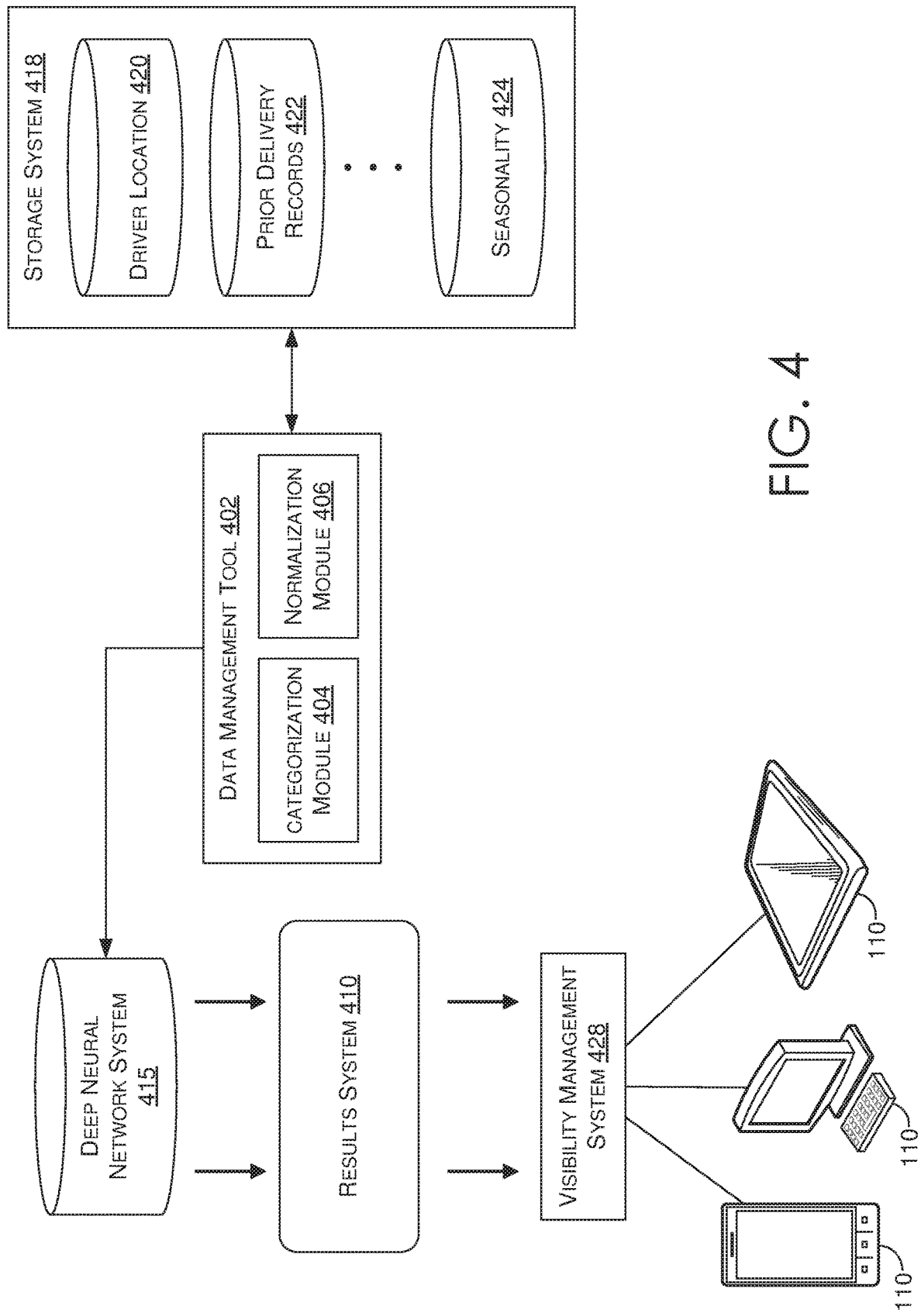
FIG. 4 is a block diagram of an exemplary shipper environment.

FIG. 4 is an example block diagram of example components of an example prediction system environment which is used to determine predicted delivery confidence intervals. The depicted prediction system environment comprises a storage system 418, a data management tool 402, a deep neural network system 415, a results system 410, and a visibility management system 428.

In some embodiments, the storage system 418 comprises a variety of delivery information including at least driver location 420, prior delivery records 422, and seasonality 424. In some embodiments, this delivery information is automatically updated, either after set time periods, or based on predetermined criteria. In some embodiments, the amount of delivery information stored in the storage system comprises data stored over the course of 18 months. In other embodiments, the oldest data is removed from the database, as the newest data is stored such that for example, the oldest one month of data is removed as the newest one month of data is updated and stored.

In some embodiments, the data management tool 402 comprises a feature extraction module 404, and a normalization module 406. In some examples, the normalization module 406 conducts a normalization of the data wherein the delivery information is normalized to filter out duplicate information, and any information missing parameters. In additional examples, the normalization module 406 prepares the data for the deep neural network system 415. In these additional examples, the normalization module 406 normalizes the features of the data via one hot encoding, wherein the features of the data are represented using a 0 or 1.

In some embodiments, the categorization module 404 separates the delivery information into training data for the deep neural network system 415 and stopping criteria data for the deep neural network system. In some embodiments, the training data and stopping criteria data are randomly selected from the normalized delivery information. In other embodiments, the training data and stopping criteria data are categorized based on date. In further embodiments, the categorization module 404 categorizes 80% of the normalized delivery information into training data and 20% of the normalized delivery information into stopping criteria data. In some embodiments, the categorization module 404 categorizes 95% of the normalized delivery information into training data and 5% of the normalized delivery information into stopping criteria data.

In some embodiments, the normalized and categorized delivery information is used by the deep neural network system 415 for determining predicted delivery confidence intervals to conduct a regression analysis. In some embodiments, the deep neural network system 415 learns features of the delivery information and responsively weights them during training. A "weight" in various instances represents the importance or significance of a feature or feature value for prediction. For example, each feature may be associated with an integer or other real number where the higher the real number, the more significant the feature is for its label or prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether a particulate predetermined image style belongs to a certain label.

In some embodiments, the deep neural network system 415 can use programming languages such as R, Java, Python, Scala, C, Weka or C++, although other languages may be used in addition or in the alternative. Similarly, the learning models can be implemented using existing software modules and framework such as Apache Spark, Apache Hadoop, Apache Storm, or Apache Flink, although other frameworks may be used in addition or in the alternative. Additionally or alternatively, the shipper behavior learning model is capable of running on a cloud architecture, for example, on cloud architectures based on existing frameworks such as a Hadoop Distributed File System (HDFS) of a Hadoop cluster. In some embodiments, the cloud architectures are memory based architectures where RAM can be used as long term storage to store data for faster performance and better scalability compared to other types of long term storage, such as a hard disk.

In some embodiments, the predicted delivery confidence intervals are stored in the results system 410 in the form of a results table. In some embodiments, the predicted delivery confidence intervals are stored in association with a corresponding Zip8 or Zip9 geographic area.

In some embodiments, the visibility management system 428 utilizes the results table to provide a predicted delivery window to a consignee whose deliver location is within at least one of the Zip8 or Zip9 geographic areas. In further embodiments, the visibility management system has direct access to the results system 410. In other embodiments, the visibility management system 428 requests the results table from the results system 410. In further embodiments, the visibility management system provides the predicted delivery window to the user device 110 of the consignee, in the form of at least one of a text based notification, or an audio based notification.

VIII. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A computerized method carried out by at least one server having at least one processor for determining a delivery confidence interval, the method comprising:
receiving delivery information from one or more sources, wherein the delivery information comprises data records associated with at least one predefined location perimeter, wherein one or more of the at least one predefined location perimeter is defined by at least one of a Zip8 or a Zip9 designation, and each of the data records corresponds to a package delivery performed within the predefined location perimeter and identifies whether the package delivery required a confirmation signature;
conducting a normalization of the data records associated with the at least one predefined location perimeter to generate normalized data, wherein the normalization reduces redundancies and removes outliers from the data records;
categorizing the normalized data into training data used to perform a deep neural network regression analysis;
determining a predicted delivery confidence interval by constructing a predictive learning model, the predictive learning model constructed by conducting a regression of the training data using deep neural network regression designed to cease learning upon detecting a predetermined reduction in error rate;
storing the predicted delivery confidence interval in a results table in association with the at least one predefined location perimeter; and
upon receiving a request from a visibility management system, accessing the results table, including prior accuracy information, to provide predicted delivery windows to consignees based at least in part on whether the package delivery required the confirmation signature.

2. The method of claim 1, further comprising:
receiving an indication of a parcel to be delivered, a delivery address of the parcel being within the at least one of the predefined location perimeter;
accessing the results table to determine a predicted delivery window for the parcel based at least in part on the predicted delivery confidence interval; and
delivering a notification to a consignee associated with the parcel that includes the predicted delivery window.

3. The method of claim 2, further comprising causing a delivery of the parcel to the consignee.

4. The method of claim 1, wherein the data records associated with the at least one predefined location perimeter comprise at least one of a driver location, prior delivery records, or seasonality.

5. The method of claim 1, wherein the at least one predefined location perimeter is not defined by a physical address.

6. The method of claim 1, wherein the deep neural network is comprised of at least two hidden layers.

7. The method of claim 1, wherein the delivery confidence interval is comprised of a likelihood of a package being delivered within a certain timeframe.

8. One or more non-transitory computer-storage media having computer executable instructions embodied thereon that, when executed, perform a method of determining a delivery confidence interval, the method comprising:
receiving delivery information from one or more sources, wherein the delivery information comprises data records associated with at least one predefined location perimeter, wherein one or more of the at least one predefined location perimeter is defined by at least one of a Zip8 or a Zip9 designation, and each of the data records corresponds to a package delivery performed within the predefined location perimeter and identifies whether the package delivery required a confirmation signature;
conducting a normalization of the data records associated with the at least one predefined location perimeter to generate normalized data, wherein the normalization reduces redundancies and removes outliers from the data records;
categorizing the normalized data into training data used to perform a deep neural network regression analysis;
determining a predicted delivery confidence interval by constructing a predictive learning model, the predictive learning model constructed by conducting a regression of the training data using deep neural network regression designed to cease learning upon detecting a predetermined reduction in error rate;
storing the predicted delivery confidence interval in a results table in association with the at least one predefined location perimeter; and
upon receiving a request from a visibility management system, accessing the results table, including prior accuracy information, to provide predicted delivery windows to consignees based at least in part on whether the package delivery required the confirmation signature.

9. The method of claim 8, further comprising:
receiving an indication of a parcel to be delivered, a delivery address of the parcel being within the at least one of the predefined location perimeter;
accessing the results table to determine a predicted delivery window for the parcel based at least in part on the predicted delivery confidence interval; and
delivering a notification to a consignee associated with the parcel that includes the predicted delivery window.

10. The method of claim 9, further comprising causing a delivery of the parcel to the consignee.

11. The method of claim 8, wherein the data records associated with the at least one predefined location perimeter comprise at least one of a driver location, prior delivery records, or seasonality.

12. The method of claim 8, wherein the at least one predefined location perimeter is not defined by a physical address.

13. The method of claim 8, wherein the deep neural network is comprised of at least two hidden layers.

14. The method of claim 8, wherein the delivery confidence interval is comprised of a likelihood of a package being delivered within a certain timeframe.

15. A computer-implemented system for determining a delivery confidence interval, the computer-implemented system comprising:
a storage system for storing and retrieving delivery information from one or more sources, wherein the delivery information comprises data records associated with at least one predefined location perimeter, wherein the at least one predefined location perimeter is defined by at least one of a Zip8 or a Zip9 designation, and each of the data records corresponds to a package delivery performed within the predefined location perimeter and identifies whether the package delivery required a confirmation signature;

a data normalization system for conducting a normalization of the data records associated with the at least one predefined location perimeter to generate normalized data, wherein the normalization reduces redundancies and removes outliers from the data records;

a categorization system for categorizing the normalized data into training data used to perform a deep neural network regression analysis;

a deep neural network system for determining a predicted delivery confidence interval by constructing a predictive learning model, the predictive learning model constructed by conducting a regression of the training data using deep neural network regression designed to cease learning upon detecting a predetermined reduction in error rate;

a results system for storing the predicted delivery confidence interval in a results table in association with the at least one predefined location perimeter; and a visibility management system for accessing the results table, including prior accuracy information, to provide predicted delivery windows to consignees based at least in part on whether the package delivery required the confirmation signature.

16. The system of claim 15, wherein the visibility management system is further for:

receiving an indication of a parcel to be delivered, a delivery address of the parcel being within the at least one of the predefined location perimeter;

accessing the results table to determine a predicted delivery window for the parcel based at least in part on the predicted delivery confidence interval; and delivering a notification to a consignee associated with the parcel that includes the predicted delivery window.

17. The system of claim 16, wherein the visibility management system is further for comprising causing a delivery of the parcel to the consignee.

18. The system of claim 15, wherein the data records associated with the at least one predefined location perimeter comprise at least one of a driver location, prior delivery records, or seasonality.

19. The system of claim 15, wherein the at least one predefined location perimeter is not defined by a physical address.

20. The system of claim 15, wherein the delivery confidence interval is comprised of a likelihood of a package being delivered within a certain timeframe.

* * * * *